United States Patent
Yang et al.

(10) Patent No.: US 9,154,208 B2
(45) Date of Patent: Oct. 6, 2015

(54) SYSTEM AND METHOD OF WIRELESS FIXED ACCESS USING A MULTIPLE ANTENNA ARRAY

(75) Inventors: Hong Yang, Ledgewood, NJ (US);
Thomas L. Marzetta, Summit, NJ (US);
Alexei Ashikhmin, Morristown, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 263 days.

(21) Appl. No.: 13/547,088

(22) Filed: Jul. 12, 2012

(65) Prior Publication Data
US 2013/0336232 A1    Dec. 19, 2013

Related U.S. Application Data

(60) Provisional application No. 61/659,154, filed on Jun. 13, 2012.

(51) Int. Cl.
*H04W 72/04* (2009.01)
*H04B 7/06* (2006.01)
*H04W 52/14* (2009.01)

(52) U.S. Cl.
CPC ........... *H04B 7/0619* (2013.01); *H04W 52/143* (2013.01); *H04B 7/0632* (2013.01)

(58) Field of Classification Search
CPC .............................. G06F 11/14; H04L 1/1819
See application file for complete search history.

(56) References Cited

U.S. PATENT DOCUMENTS

| | | | |
|---|---|---|---|
| 6,711,416 B1 | 3/2004 | Zhang | |
| 2008/0037689 A1* | 2/2008 | Kurt et al. | 375/340 |
| 2009/0047987 A1 | 2/2009 | Li et al. | |
| 2010/0226455 A1 | 9/2010 | Porat et al. | |
| 2012/0093253 A1* | 4/2012 | Park et al. | 375/285 |

FOREIGN PATENT DOCUMENTS

EP    2 378 674 A1    10/2011

OTHER PUBLICATIONS

Hong Yang and T.L. Marzetta, "Performance of conjugate and zero-forcing beamforming in large-scale antenna system, submitted to IEEE JSAC Special Issue on Large-Scale Multiple Antenna Wireless Systems", Jan. 2012.

Hien Quoc Ngo, et. al., "Energy and Spectral Eficiency of Very Large Multiuser MIMO Systems," Submitted to the IEEE Transactions on Communications, arXIV: 1112.3810v2 [cs.IT], May 21, 2012, 31 pages.

* cited by examiner

*Primary Examiner* — Huy D Vu
*Assistant Examiner* — Teisha D Hall
(74) *Attorney, Agent, or Firm* — Chiesa Shahinian & Giantomasi PC

(57) ABSTRACT

A new method is disclosed for providing wireless fixed access from an array of service antennas to a population of local terminals. In implementations, a service transceiver station (STS) performs beamform precoding using channel state information (CSI) obtained from transmissions by the local terminals, and the STS performs power allocation using slow fading coefficients which are static over the service antenna positions and over a frequency range spanning at least some carriers used for downlink transmission.

9 Claims, 3 Drawing Sheets

| UPLINK DATA 100 | PILOT SIGNALS 110 | DOWNLINK DATA 120 |

FIG. 2

SYSTEM AND METHOD OF WIRELESS FIXED ACCESS USING A MULTIPLE ANTENNA ARRAY

CROSS-REFERENCE TO RELATED APPLICATION

This application claims priority of Provisional Application Ser. No. 61/659,154 which was filed on Jun. 13, 2012.

FIELD OF THE INVENTION

The invention relates to access methods in communication systems, and more particularly to access methods that include transmission over a wireless link.

ART BACKGROUND

In rural areas and generally in developing countries, it is expensive to rely on fiber or cable to provide broadband internet service to households and other user premises because in rural areas the user premises are usually widely separated and because developing countries generally suffer a paucity of existing broadband communication infrastructure.

For a lower-cost alternative, traditional wireless technologies such as EVDO or LTE have been proposed for providing access and/or backhaul transport in support of broadband services. However, these technologies may be too limited in spectral efficiency to assure satisfactory levels of service.

Hence, there remains a need for alternative wireless technologies that can provide access and/or backhaul transport in support of broadband services.

SUMMARY OF THE INVENTION

We have developed a new method of providing wireless fixed access from an array of service antennas to a population of local terminals which comprises:

beamform precoding using channel state information (CSI) obtained from transmissions by the local terminals; and power allocating using slow fading coefficients which are static over the service antenna positions and over a frequency range spanning at least some carriers used for downlink transmission.

In another embodiment, we have provided a new method which comprises:

obtaining CSI from transmissions by the local terminals, wherein the CSI has fast-fading and slow-fading components between said array and said local terminals;

allocating power for transmission of uplink messages from respective ones of the local terminals to a multiple-antenna array, wherein said allocating is performed using only slow-fading components of the CSI;

receiving the transmitted uplink messages on the multiple-antenna array; and decoding the received messages using the CSI.

In embodiments, the local terminals are user terminals having no more than local premises mobility.

In embodiments, the local terminals are wireless base stations serving user terminals, and the wireless fixed access is backhaul access for the base stations.

BRIEF DESCRIPTION OF THE DRAWINGS

FIG. 2 is a schematic diagram of an exemplary frame format for use in implementations of the methods described here.

DETAILED DESCRIPTION

Figure 1:
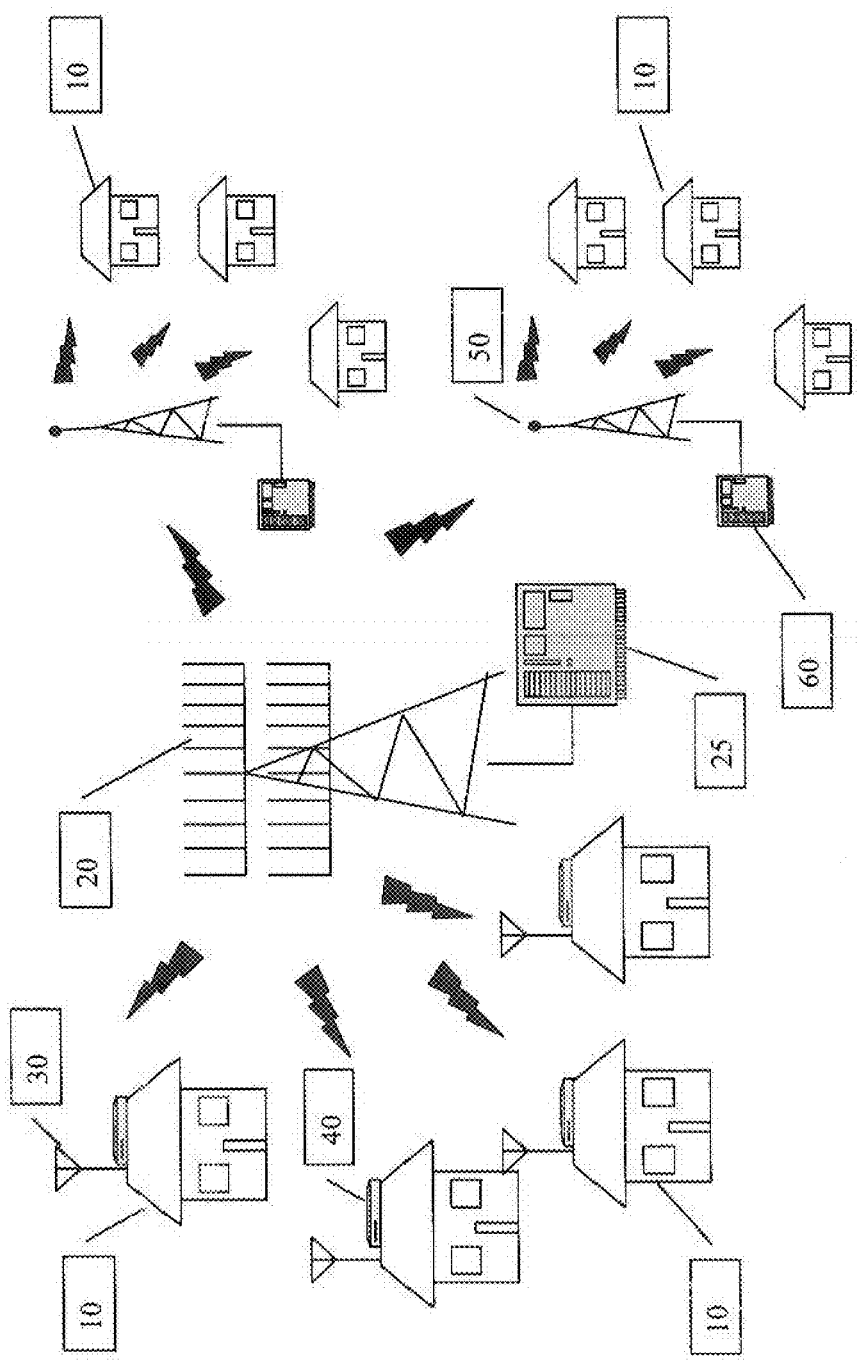
FIG. 1 is a schematic drawing of an access network in a typical rural area.

FIG. 1 illustrates an access network in a typical rural area. A plurality of user premises 10 are served over wireless links by service antenna array 20 connected to a service transceiver station 25 which includes circuitry for conditioning signals for transmission from array 20 and for processing signals received on array 20, and which also includes circuitry for connection to the public telephone network, networks of internet service providers, and the like. On the premises of each user, the downstream end of the link is marked by antenna or antenna array 30 connected to a user terminal 40.

Antennas 30 may be fixed; for example, they may be immobilized in fixtures attached to the roofs of houses and other buildings. Alternatively, at least some of the antennas 30 may be connected to terminals 40 having some limited mobility. That is, the terminals 40 may be cellphones, laptop computers, or other portable wireless communication devices that can be moved around while in use.

Within the present context, such devices may continue to mark the downstream end of the wireless link while moving at speeds typical of human locomotion, provided they remain on their home user premises or within a few tens of meters of their home premises. We refer to such limited mobility as "local premises mobility". As will be seen, the geographical boundaries for local premises mobility depend on several factors, including the geographical density of user premises and the length of the interval for updating channel coefficients.

In another implementation, also shown in the figure, the downstream ends of the wireless links are marked by antennas or antenna arrays 50 connected to base stations 60. Each base station may, for example, be a microcell or nanocell serving a residential subdivision or business park. In such an implementation, the wireless link functions as part of the backhaul network supporting the base station. We will use the term "access network" to refer to both kinds of implementation; i.e., to networks supporting the delivery of Internet, double and triple play, and other like services to users, and also to networks providing backhaul transport to support base stations.

Although not essential for the operation of the system that is to be described, it is advantageous for service antenna array 20 to be an array of a Large-Scale Antenna System (LSAS), in which the total number M of antennas is greater than the number of user terminals, and preferably tens, or even hundreds, of times larger. LSAS systems are advantageous because they potentially offer large array processing gains and large spatial diversity gains.

When LSAS arrays, or indeed any antenna arrays are deployed in a system in which the user-terminal antennas are fixed (or at most local premises mobile), there is the further advantage that coherence intervals tend to be very long compared with fully mobile wireless networks.

When these various advantages are combined, it becomes feasible for a single suitably adapted LSAS site to serve several thousand households, each with more than 10 Mbps bandwidth in the downlink, in geographical region having a diameter of hundreds of kilometers or more.

By way of example, it would be feasible to deploy 10,000 service antennas on a tower if, e.g., the antennas are arrayed in a grid pattern 100 antennas to a side, spaced one-half wavelength apart. At a frequency of 1.9 GHz, the mounting panel for the antennas would have a span of about 8 meters by 8 meters. Similarly, 40,000 antennas could be mounted on a panel having a span of about 16 meters by 16 meters. Even greater economies of space might be achieved by arranging the antennas in a three-dimensional, rather than a two-dimensional, grid pattern.

As noted above, very large channel coherence intervals can be assumed, particularly if the user antennas are stationary. For example, if the coherence time is taken for illustrative purposes to be the time it takes to effectively shift the position of a user terminal by one-quarter wavelength, and if the fluctuations in the propagation channel are taken as equivalent to user mobility at 5 km per hour, then the coherence time (assuming a 1.9 GHz carrier frequency) is estimated to be 28.44 ms.

User antennas can employ various performance-enhancing features. For example, the use of multiple-antenna arrays at the user premises can increase spectral efficiency. Antenna placement at the user premises can be optimized to minimize the radiofrequency path loss to the service antenna array.

An exemplary system operates in time-division duplex (TDD) mode. In TDD operation, reciprocity is assumed between the uplink (UL) and downlink (DL) channel coefficients. Thus, channel coefficients measured at the service antenna array from uplink pilot signals received from the user terminals are assumed to apply, within the same coherence interval, to both the uplink and the downlink.

In illustrative embodiments, the service transceiver station uses knowledge of the channel coefficients to precode the downlink transmissions. The precoding is for the well-known practice of beamforming, which imparts spatial selectivity to the downlink transmissions so that the downlink signal destined for a given user suffers relatively little interference from synchronously transmitted downlink signals destined for other users.

Illustratively, all user terminals synchronously transmit their respective pilot signals on the uplink, and the service transceiver station synchronously transmits the downlink signals to all of the user terminals from the service antenna array. In other embodiments, the population of user terminals may be divided into user subpopulations which are separated into different timeslots for pilot transmission and/or for downlink signal transmission.

Division into user subpopulations can be advantageous, for example, when the number of users is greater than the number of mutually orthogonal pilot signals, so that to avoid pilot contamination, pilot signals need to be reused in different timeslots. Pilot contamination arises among users transmitting mutually non-orthogonal pilot signals within the same timeslots. A signal nominally beamformed to one of such users may, as a result of pilot contamination, include interference from signals nominally beamformed to the other such users.

It should be noted in this regard that because coherence intervals will generally be very large, it will be possible to define pilot signals as corresponding to very long symbol sequences, and thus a large number of mutually othogonal pilot sequences may be constructed. For example, let us assume that OFDM modulation is used. We will estimate the maximum number of mutually orthogonal pilot sequences as the product of two estimated factors: the number of OFDM tones within the frequency interval over which the propagation channel can be treated as approximately constant, times the number of OFDM symbols that can be transmitted during a coherence interval.

The propagation channel is treated as piecewise constant. The frequency width of each subband over which the channel can be assumed constant is the Nyquist sampling interval as expressed in frequency terms, i.e., the inverse of the delay spread of the channel. Within each subband, the channel can be estimated from the uplink pilot sequences, which would be indexed by both OFDM tone and by OFDM symbol. That is, the element of a given pilot sequence that is transmitted in a given transmission time interval is identified by a selected OFDM tone (i.e., subcarrier) lying within the pertinent subband, in combination with a selected OFDM symbol.

A maximum of d mutually orthogonal pilot sequences can be created. We let $T_u$ represent the usable symbol interval, $T_{sl}$ represent the slot duration (which we assume to be equal to the coherence interval), $T_d$ represent the channel delay spread, and $T_s$ represent the OFDM symbol interval. Then d is given by:

$$d = \frac{T_u}{T_d} \times \frac{T_{sl}}{T_s},$$

where $T_u/T_d$ is the Nyquist sampling interval expressed in number of tones, and $T_{sl}/T_s$ is length of a pilot sequence, in the number of OFDM symbols that are used.

For typical values, used here for purposes of illustration only, and taking the second as the unit of time, we have $T_s=10^{-3}/14$, $T_u=10^{-3}/15$, $T_d=T_s-T_u=10^{-3}/210$. This leads to an estimate for the Nyquist sampling interval of 14 tones, so that in a 20 ms slot, containing 280 OFDM symbols, a maximum of 14×280=3920 mutually orthogonal pilot sequences can be created.

The geographical locations of the user premises will typically be known before the system is put into operation. A stored tabulation of the bearings of each of the user premises and their distances from the service antennas can be used to facilitate the initial beamforming when the system is first started up, and when service is restored after an outage.

Illustratively, beamforming for the downlink is performed by applying the channel coefficients (as estimated from the pilot signals) in the well-known process of conjugate beamforming precoding. Reception on the uplink is illustratively performed by likewise applying the channel coefficients in the well-known process of maximum ratio combining. Information that is derived from, or related to, the channel coefficients and useful for, e.g., such precoding and combining is referred to here as channel state information (CSI).

In illustrative embodiments, the air-interface resources will be allocated to downlink transmissions in blocks which span one or more transmission time intervals and one or more OFDM frequency subcarriers. Orthogonal or quasiorthogonal codes may also be allocated.

As noted above, the channel coefficients are typically estimated from uplink pilot signals. The pilot signals are typically transmitted as part of a frame format as illustrated, for example, in FIG. 2. In the figure, it will be seen that portion 100 of the frame format contains the uplink data transmissions. It is followed by portion 110, which contains the pilot signals. At the service transceiver station, information derived from the pilot signals as received is used to decode the uplink signals and to generate the coefficients for precoding the downlink signals. In the following portion 120 of the frame format, the precoded downlink signals are transmitted.

The pilot signals are preferably transmitted at maximum power from the user terminals to obtain the best possible channel estimates.

We now define $g_{mk}$ to be the channel coefficient between the m-th antenna of the service antenna array and the k-th user terminal. We assume here that there is only one antenna per user terminal. Extensions to multiple-antenna user terminals are straightforward. The channel coefficients $g_{mk}$ will also generally be dependent on frequency. For simplicity of presentation, we have suppressed the frequency dependence in this portion of the discussion.

In an alternative method, the channel coefficients are estimated by a successive approximation process without using pilot signals, or with the use of pilot signals on rare occasions such as initialization and recovery from a network failure. The alternative method relies on observed SINR values returned on a regular basis from the user terminals to the service transceiver station. In many communication systems, such SINR values are returned to the base station for use by the base station in selecting modulation and coding parameters and the like. By using successive approximations, it is possible to reduce the complexity that would otherwise attend the use of pilot signals for channel measurement.

The steps of the alternative method, in an exemplary implementation, are described below with specific reference to an algorithm specified under the heading "ALGORITHM 1". ALGORITHM 1 is one of a pair of algorithms (ALGORITHM 1 AND ALGORITHM 2) to be used for estimating the channel coefficients. ALGORITHM 1 as described below is applied to one pair consisting of a user k and a service antenna m. The same is true of ALGORITHM 2, which is not described below in detail.

Because the network geometry will typically be static or nearly static, the channel vectors of all of the users will generally be slowly changing. For that reason, the pair of algorithms can be applied in turn to each user, and for each user, it can be applied in turn to each service antenna in a continual cycle which returns periodically to the first user and the first service antenna. By cycling in such a manner, the algorithms will adapt the channel coefficients on a trajectory that tracks the physical evolution of the propagation channel.

Before applying the algorithms, an initial estimate $\hat{g}_{mk}$ is obtained of the true channel coefficient $g_{mk}$. To assure that each algorithm will converge, it is desirable to obtain a good estimate. Therefore, in at least some implementations the initial estimate is obtained using pilot signals.

In the following discussion, the subscripts m and k will be suppressed to simplify the notation.

The initial channel estimate (for a given m and k) is factored into amplitude and phase terms according to $\hat{g}=\hat{\alpha}e^{j\hat{\phi}}$, where $\hat{\alpha}$ is the estimate of the true amplitude $\alpha$ and $\hat{\phi}$ is the estimate of the true phase $\phi$.

ALGORITHM 1 operates to find a refined estimate for $\phi$ while the initial estimate for $\alpha$ remains fixed. ALGORITHM 2 then operates to find a refined estimate for $\alpha$ while $\phi$ remains fixed.

In each of various steps specified below, the service transceiver station will use a current channel estimate for precoding and transmitting a signal to the user, and the user will return a corresponding value of the SINR. We will denote by SINR($\theta$) the returned SINR value that corresponds to a particular estimate $\theta$ for the channel coefficient (while the estimate for $\alpha$ remains fixed).

In ALGORITHM 1 as described below, three bins, each containing an estimate of the phase coefficient, are iteratively updated. The three bins are respectively denoted $\hat{\phi}$, $\phi_0$, and $\phi_1$.

The bin denoted $\hat{\phi}$ contains the current estimate of the true phase $\phi$. Accordingly, it is initialized with an initial estimate and updated at each iteration of the algorithm. When the algorithm exits due to convergence, the bin $\hat{\phi}$ will contain the final estimate.

The symbol $\delta$ represents an increment of phase angle. The size of $\delta$ may be set arbitrarily, but to assure convergence of the algorithm, it is desirably set close to, but somewhat greater than, the expected error in the initial estimate $\hat{\phi}$. The symbol $\epsilon$ represents a convergence threshold.

---

ALGORITHM 1

1. Initialize $\hat{g} = \hat{\alpha}e^{j\hat{\phi}}$, where $\hat{\alpha}$ is the initial estimate of the true amplitude $\alpha$, $\hat{\phi}$ is the initial estimate of the true phase $\phi$, and $j^2 = -1$.
2. Obtain SINR($\hat{\phi} + \delta$) and SINR($\hat{\phi} - \delta$).
3. If SINR($\hat{\phi} + \delta$) > SINR($\hat{\phi} - \delta$), assign $\phi_0 \leftarrow \hat{\phi}$, $\phi_1 \leftarrow \hat{\phi} + \delta$; Otherwise, assign $\phi_0 \leftarrow \hat{\phi}$, $\phi_1 \leftarrow \hat{\phi} - \delta$.
4. Update $\hat{\varphi} \leftarrow \frac{1}{2}(\varphi_0 + \varphi_1)$.
5. Obtain $S_0 = $ SINR($\phi_0$) and $S_1 = $ SINR($\phi_1$).
6. If $S_0 > S_1$, update $\phi_0 \leftarrow \phi_0$, $\phi_1 \leftarrow \hat{\phi}$; Otherwise, update $\phi_0 \leftarrow \phi_1$, $\phi_1 \leftarrow \hat{\phi}$.
7. If $|\phi_0 - \phi_1| \geq \epsilon$, return to Step 4. Otherwise, continue.
8. Update $\hat{\varphi} \leftarrow \frac{1}{2}(\varphi_0 + \varphi_1)$. END.

---

ALGORITHM 2 is analogous to ALGORITHM 1 and need not be described in detail. After ALGORITHM 2 converges to a good estimate $\hat{\alpha}$, the estimates can be combined to form the estimate for the channel coefficient $\hat{g}=\hat{\alpha}e^{j\hat{\phi}}$.

In approaches that do use pilot signals for estimating the channel coefficients, it may in some cases be advantageous to have only a selected subset of user terminals transmit pilot signals at a given time. In one such approach, the service array receives SINR feedback from the user terminals and selects those user terminals that have suffered the greatest degradation in SINR to be those which transmit pilot signals when the next opportunity comes around. Although such an approach suffers a penalty in increased control signaling, it may also offer advantages in decreased processing at the service array and it may also facilitate reuse of pilot signals.

The coefficient $g_{mk}$ can be factored as $g_{mk}=h_{mk}\beta_k^{1/2}$, wherein $h_{mk}$ is attributable to fast fading phenomena, and $\beta_k^{1/2}$ attributable to slow-fading phenomena which are more weakly dependent not only on time, but also on position and on frequency. As represented here, the term $\beta_k^{1/2}$ is indexed only for the pertinent user terminal k and not for any service antenna, because we assume that the slow-fading coefficients can be treated as spatially constant on the scale of the service antenna array.

The slow-fading coefficients $\beta_k^{1/2}$ can be obtained, e.g., by averaging the channel coefficients $g_{mk}$ over frequency bins and over the collection of service antennas. In an alternative approach, the slow-fading coefficients are measured using special pilot signals, which are transmitted less frequently than those used for measuring the $g_{mk}$. Such an approach will generally be very tractable, not least because the slow-fading coefficients $\beta_k^{1/2}$ can generally be assumed constant over the M base station antennas, over frequency, and over at least several timeslots.

Thus, for example, or more OFDM symbols are dedicated for slow-fading coefficient estimation. Typically, about 1400 distinct tones will be available per OFDM symbol. (This estimate assumes a 20-MHz bandwidth and a symbol duration of $$\frac{2}{3} \times 100 \text{ microseconds}).$$

Each user terminal is assigned a different one of the available tones, so that for all k, the k-th terminal sends a pilot signal in the $q_k$-th tone.

The service array will detect at the m-th antenna, on the $q_k$-th tone, the channel coefficient $g_m(q_k) = \beta_k^{1/2} h(q_k)$, where $g_m(q_k)$ is the channel coefficient on tone $q_k$ between the m-th base station antenna and the k-th terminal. As explained above, the slow-fading coefficient $\beta_k^{1/2}$ is approximately independent of $q_k$ and of m. Under the generally reasonable assumption that for all m and k, $h_m(q_k)$ is randomly distributed with unit variance, we estimate $\beta_k$ as $$\beta_k \cong \frac{|g_1(q_k)|^2 + |g_2(q_k)|^2 + \ldots + |g_M(q_k)|^2}{M}.$$

To improve the estimates, multiple tones may be assigned to each user terminal and averaging may be performed over the tones. Likewise, averaging may be performed over multiple OFDM symbols.

One important feature of our wireless access system is that power control algorithms for the uplink and for the downlink can be devised, which do not rely on knowledge of the fast-fading coefficients, but only on the slow-fading coefficients.

In regard to downlink power control, theoretical analysis has shown that with conjugate beamforming precoding, the throughput of the k-th user terminal has a lower bound given by the following formula:

$$\Theta_{DL,LSAS,cj,k} = B\left(1 - \frac{\tau_r}{T}\right)\log_2\left(1 + \lambda_k M \frac{\beta_k \rho_f}{1 + \beta_k \rho_f} \cdot \frac{\beta_k \tau_r \rho_r}{1 + \beta_k \tau_r \rho_r}\right), \quad (1)$$

where $\rho_f$ and $\rho_r$ are the nominal signal-to-noise ratios) for the downlink and uplink respectively, $\tau_r$ is the uplink pilot sequence length, $\beta_k^{1/2}$ is the slow-fading coefficient for the k-th user terminal, T is the total number of symbols in the coherence interval, B is the carrier bandwidth, M is the number of antennas at the base station, and $\lambda_k$ is the percentage of downlink power allocated to the k-th subscriber. The coefficient $\lambda_k$ is defined such that with K subscribers simultaneously in service, we have $$\sum_{k=1}^{K} \lambda_k = 1, \lambda_k > 0.$$

Using Equation (1), we have devised a power-control strategy that will tend to equalize the downlink signal-to-interference-and-noise ratios (SINR) of all active users. That is, let $$\Gamma_k = \frac{\beta_k \rho_f}{1 + \beta_k \rho_f} \cdot \frac{\beta_k \tau_r \rho_r}{1 + \beta_k \tau_r \rho_r} \text{ and } \Lambda = \sum_{k=1}^{K} \frac{1}{\Gamma_k}. \quad (2)$$

From Equation (2), it is readily ascertained that from the power-fraction choice $$\lambda_k = \frac{1}{\Lambda \Gamma_k},$$

it follows that $\lambda_1 \Gamma_1 = \ldots = \lambda_K \Gamma_K$. Upon substituting this result into Equation (1), it will be seen that (because equal SINR implies equal throughput) the resulting throughput is equalized over all users.

It will be understood that in implementations, the above power-control strategy is deterministic, but adapted as needed or periodically when the slow-fading coefficients are updated.

Similar DL power control strategies can be derived to allocate the power to subscribers according to the grade of service subscribed.

In regard to uplink power control, the user terminals receive feedback of the values of the slow-fading coefficients from the STS, which they use, for example, to equalize the uplink SINR over all active user terminals.

We will now describe an uplink power control strategy that equalizes the throughput among all the active users.

We assume there are K active user terminals. We estimate the radiofrequency path loss between the K respective user terminals and the service array by $\{1/\beta_1^{1/2}, \ldots, 1/\beta_K^{1/2}\}$. Without loss of generality, we now assume that the k=1 user terminal has the highest path loss from the service array; i.e., that $\beta_1^{1/2} = \min\{\beta_1^{1/2}, \ldots, \beta_K^{1/2}\}$. Then the uplink power control strategy that will equalize the uplink throughput among all the active users is Terminal 1: maximal available power $P_r$, $$\text{Terminal } k: \frac{(1 + \tau_r P_r \beta_k)\beta_1^2}{(1 + \tau_r P_r \beta_1)\beta_k^2} P_r \quad k = 2, \ldots, K \quad (3)$$

We derived the above strategy from a theoretical lower bound on the uplink capacity in LSAS systems, which was described in H. Q. Ngo, E. G. Larsson, and T. L. Marzetta, "Energy and Spectral Efficiency of Very Large Multiuser MIMO Systems," submitted to *IEEE Trans. on Comm.*, May 2012.

EXAMPLE

Figure 3:
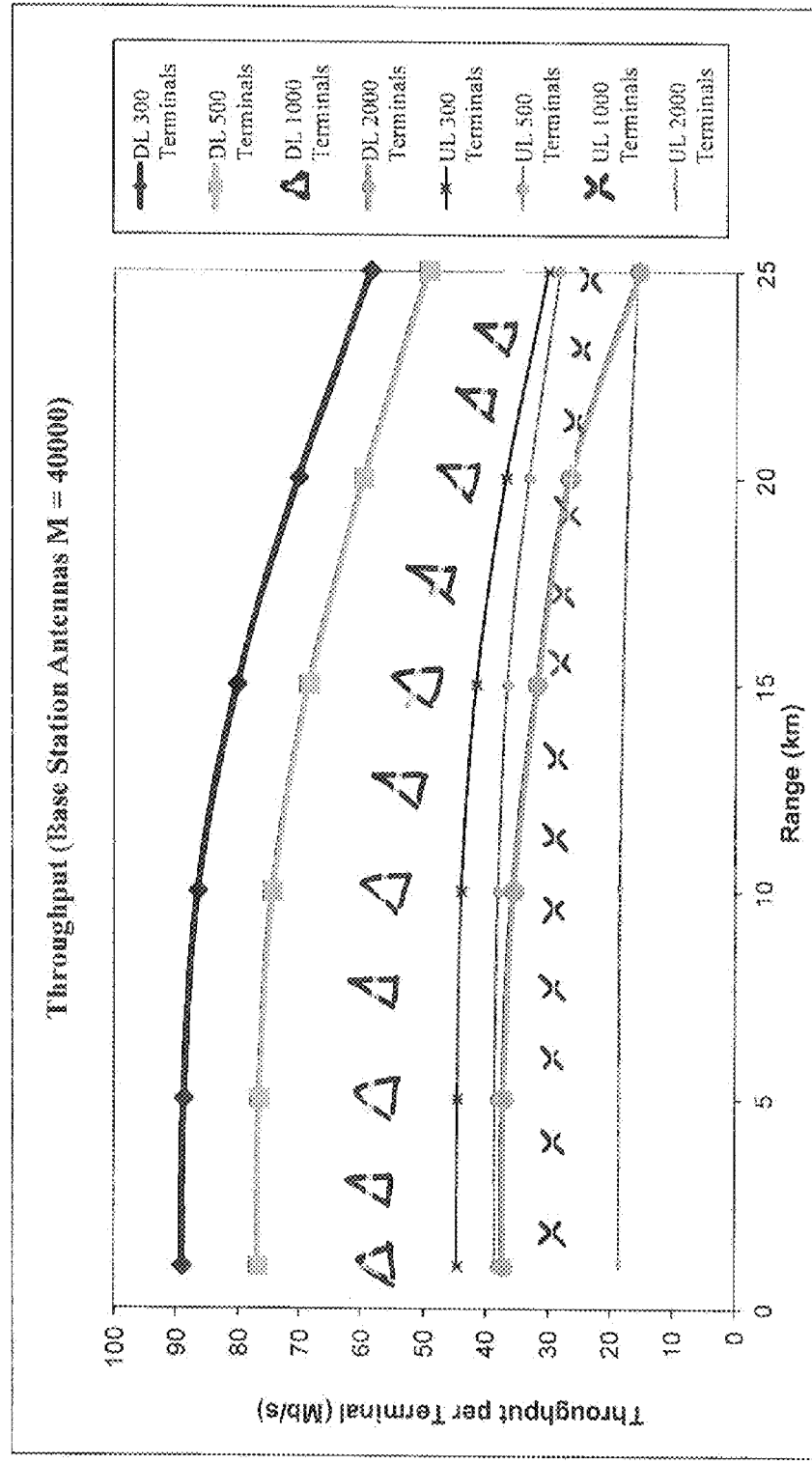
FIG. 3 is a plot showing downlink and uplink throughput achievable using the herein-described methods as predicted from simulations assuming a 20-MHz bandwidth.

An example of achievable downlink and uplink throughput as predicted from simulations assuming a 20-MHz bandwidth is plotted in FIG. 3.

We claim:
1. A method for providing wireless fixed access between an array of service antennas and a population of local terminals, comprising:
    obtaining channel state information (CSI) from transmissions by the local terminals, wherein at least some of the CSI is obtained by successive approximations using indications of signal-to-noise-and interference ratio (SINR) fed back from local terminals, the successive approximations including a first approximation of phase based on an estimate of amplitude and a second approximation of amplitude based on an estimate of phase, and wherein the CSI has fast-fading and slow-fading components between said array and said local terminals;
    beamform precoding messages destined for at least some of the local terminals using the CSI;

allocating power for transmission from a multiple-antenna array to respective ones of the local terminals, wherein said allocating is performed using only slow-fading components of the CSI; and transmitting the precoded messages to the local terminals at the allocated power levels.

2. The method of claim 1, wherein the local terminals are user terminals having no more than local premises mobility.

3. The method of claim 1, wherein the local terminals are wireless base stations serving user terminals, and the wireless fixed access is backhaul access for the base stations.

4. The method of claim 1, wherein at least some of the CSI is obtained from pilot signals transmitted by the local terminals.

5. A method for providing wireless fixed access between an array of service antennas and a population of local terminals, comprising:

obtaining channel state information (CSI) from transmissions by the local terminals, wherein at least some of the CSI is obtained by successive approximations using indications of signal-to-noise-and interference ratio (SINR) fed back from local terminals, the successive approximations including a first approximation of phase based on an estimate of amplitude and a second approximation of amplitude based on an estimate of phase, and wherein the CSI has fast-fading and slow-fading components between said array and said local terminals;

allocating power for transmission of uplink messages from respective ones of the local terminals to a multiple-antenna array, wherein said allocating is performed using only slow-fading components of the CSI;

receiving the transmitted uplink messages on the multiple-antenna array; and decoding the received messages using the CSI.

6. The method of claim 5, wherein the decoding is performed, at least in part, by maximum ratio combining.

7. The method of claim 5, wherein the local terminals are user terminals having no more than local premises mobility.

8. The method of claim 5, wherein the local terminals are wireless base stations serving user terminals, and the wireless fixed access is backhaul access for the base stations.

9. The method of claim 5, wherein at least some of the CSI is obtained from pilot signals transmitted by the local terminals.

* * * * *